US010424086B2

(12) United States Patent
Chen et al.

(10) Patent No.: US 10,424,086 B2
(45) Date of Patent: Sep. 24, 2019

(54) OIL PAINTING STROKE SIMULATION USING NEURAL NETWORK

(71) Applicant: Adobe Inc., San Jose, CA (US)

(72) Inventors: Zhili Chen, San Jose, CA (US); Zhaowen Wang, San Jose, CA (US); Rundong Wu, Ithaca, NY (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 9 days.

(21) Appl. No.: 15/814,751

(22) Filed: Nov. 16, 2017

(65) Prior Publication Data

US 2019/0147627 A1    May 16, 2019

(51) Int. Cl.
*G06T 11/00* (2006.01)
*G06T 9/00* (2006.01)
*G06T 11/40* (2006.01)

(52) U.S. Cl.
CPC ............ *G06T 11/001* (2013.01); *G06T 9/002* (2013.01); *G06T 11/40* (2013.01)

(58) Field of Classification Search
CPC ........ G06T 11/001; G06T 11/40; G06T 9/002
USPC ......... 345/8, 157, 419, 426, 589; 1/1; 703/9; 726/26
See application file for complete search history.

(56) References Cited

U.S. PATENT DOCUMENTS

| | | | | |
|---|---|---|---|---|
| 5,611,036 A | * | 3/1997 | Berend | G06T 11/001 345/441 |
| 5,687,304 A | * | 11/1997 | Kiss | G06T 15/04 345/419 |
| 5,754,183 A | * | 5/1998 | Berend | G06T 11/001 345/592 |
| 7,181,768 B1 | * | 2/2007 | Ghosh | G06F 21/552 726/23 |
| 8,988,461 B1 | * | 3/2015 | Schmid | G06T 11/001 345/426 |
| 9,142,056 B1 | * | 9/2015 | Baran | G06T 15/00 |
| 2007/0070038 A1 | * | 3/2007 | Hoffberg | G06F 3/0482 345/156 |
| 2009/0153468 A1 | * | 6/2009 | Ong | G06F 3/011 345/156 |
| 2012/0133664 A1 | * | 5/2012 | Zhu | G06T 11/001 345/582 |

(Continued)

OTHER PUBLICATIONS

"Adobe Photoshop", retrieved from the Internet: https://en.wikipedia.org/wiki/Adobe_Photoshop [copy retrieved Dec. 8, 2017], 16 pages.

(Continued)

*Primary Examiner* — Prabodh M Dharia
(74) *Attorney, Agent, or Firm* — Finch & Maloney PLLC (57) ABSTRACT

Oil painting simulation techniques are disclosed which simulate painting brush strokes using a trained neural network. In some examples, a method may include inferring a new height map of existing paint on a canvas after a new painting brush stroke is applied based on a bristle trajectory map that represents the new painting brush stroke and a height map of existing paint on the canvas prior to the application of the new painting brush stroke, and generating a rendering of the new painting brush stroke based on the new height map of existing paint on the canvas after the new painting brush stroke is applied to the canvas and a color map.

14 Claims, 7 Drawing Sheets

(56) References Cited

U.S. PATENT DOCUMENTS

| | | | | |
|---|---|---|---|---|
| 2012/0206330 A1* | 8/2012 | Cao | ............... | G06F 3/0383 345/156 |
| 2012/0215510 A1* | 8/2012 | Metaxas | ............... | G06T 13/20 703/9 |
| 2013/0120324 A1* | 5/2013 | DiVerdi | ............... | G06F 3/0488 345/179 |
| 2013/0120426 A1* | 5/2013 | DiVerdi | ............... | G06T 11/001 345/589 |
| 2014/0184496 A1* | 7/2014 | Gribetz | ............... | G02B 27/017 345/156 |
| 2015/0316982 A1* | 11/2015 | Miller | ............... | G06F 3/011 345/156 |
| 2016/0026253 A1* | 1/2016 | Bradski | ............... | G02B 27/225 345/8 |
| 2016/0148395 A1* | 5/2016 | Kim | ............... | G06T 11/001 345/589 |
| 2017/0148222 A1* | 5/2017 | Holzer | ............... | H04N 13/243 |
| 2017/0177997 A1* | 6/2017 | Karlinsky | ............... | G06N 3/08 |
| 2017/0186191 A1* | 6/2017 | Kim | ............... | G06T 11/001 |
| 2018/0253869 A1* | 9/2018 | Yumer | ............... | G06T 11/001 |
| 2018/0260984 A1* | 9/2018 | Severenuk | ............... | G06T 11/203 |
| 2019/0096125 A1* | 3/2019 | Schulter | ............... | G05D 1/0246 |
| 2019/0102646 A1* | 4/2019 | Redmon | ............... | G06K 9/4619 |
| 2019/0130214 A1* | 5/2019 | N | ............... | G06N 3/0454 |

OTHER PUBLICATIONS

"Adobe Photoshop Sketch", retrieved from the Internet: http://www.adobe.com/products/sketch.html [copy retrieved Dec. 8, 2017], 6 pages.

"Adobe Research, NVIDIA Collaborate on World's First Real-time 3D Oil Painting Simulator", retrieved from the Internet: https://blogs.nvidia.com/blog/2016/07/26/adobe-wetbrush/ [copy retrieved Nov. 30, 2017], 3 pages.

"ArtRage", retrieved from the Internet: https://en.wikipedia.org/wiki/ArtRage [copy retrieved Nov. 30, 2017], 13 pages.

"Corel Painter", retrieved from the Internet: https://en.wikipedia.org/wiki/Corel_Painter [copy retrieved Dec. 8, 2017], 4 pages.

"Fresh Paint", retrieved from the Internet: https://en.wikipedia.org/wiki/Microsoft_Fresh_Paint [copy retrieved Dec. 8, 2017], 2 pages.

* cited by examiner

OIL PAINTING STROKE SIMULATION USING NEURAL NETWORK

FIELD OF THE DISCLOSURE

This disclosure relates generally to painting simulation, and more particularly, to simulation of oil painting brush strokes using neural networks.

BACKGROUND

Paint simulation programs have been developed that simulate artistic oil painting on a computer. Conventional oil paint simulation programs typically provide a virtual paint brush for use by an artist to paint (create a painting) on a digital canvas. These programs attempt to simulate the texture of oil paints, and the manner in which the bristles of the paint brush smear the oil paint across the canvas. Many oil paint simulation programs model oil painting brush strokes by stamping a pre-defined 2D brush imprint along a brush stroke path, and simulate paint transfer between the brush stroke and the canvas using pickup maps. In these simulations, the paint is often represented in 2D. However, a real, physical oil painting does not look like a flat 2D image. The paint in a physical oil painting has depth and texture. As a result, many of the conventional paint simulation programs are unable to realistically model real paint brush strokes used in physical oil paintings.

Realistic representation of surface thickness of oil paints on a canvas is necessary to simulate artistic oil painting on a computer. Such representation refers to the thickness of applied oil paint that extends above the canvas surface in the z-direction (coming out of canvas). Realistically representing the surface thickness of oil paints requires modeling of realistic oil painting brush strokes. As mentioned above, one approach to model oil painting brush strokes is to stamp pre-defined 2D brush imprints and simulate the paint transfer between the brush stroke and the canvas. Unfortunately, modeling oil painting brush strokes in this manner produces low quality representations of the 3D surface details of brush strokes and, accordingly, low quality simulations of an oil painting.

Another approach to model oil painting brush strokes is to simulate many hundreds or even thousands of individual bristles of a paint brush, and the interaction among the bristles to generate accurate brush shape. Although this approach produces higher quality representations of the 3D surface details of brush strokes, this approach unfortunately requires the use of complex fluid simulation. As such, this approach is computationally very expensive (which also increases power consumption) and not feasible for computing devices that lack the necessary computing power, such as mobile computers and mobile devices, to name a few examples.

Other possible approaches include data-driven, texture synthesis approaches to model oil painting brush strokes. These approaches typically involve collecting a corpus of example brush stroke segments, usually from photographs of real brush strokes. Then, for an input painting brush stroke, the example brush stroke segments are identified that closest match the input stroke path shapes, and optimization is performed to seamlessly connect the identified example brush stroke segments. Unfortunately, these approaches often produce repeated patterns or otherwise limited patterns that do not capture the full set of dynamics and variations of a real brush stroke.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed herein for simulation of oil painting brush strokes using a neural network that is specifically trained based on a so-called height map indicative of existing paint on a canvas, as will be further explained in turn. The simulation of oil painting brush strokes provides a realistic reconstruction of the surface thickness of the oil paint, which is utilized to provide a high quality, realistic simulation of an oil painting. According to an embodiment, the neural network is trained using supervised learning to infer a function from a large number of training data sets. In more detail, each training data set is comprised of a height map of existing paint on a canvas, a bristle trajectory map that represents a painting brush stroke, and a ground truth, which is the expected height map resulting from applying the painting brush stroke to the existing paint on the canvas. Once trained, the objective of a trained neural network is to infer, for a given height map of existing paint on a canvas and a bristle trajectory map representing a new painting brush stroke, a height map of paint on the canvas after the new painting brush stroke is applied to the canvas. That is, the trained neural network infers the new paint on the canvas resulting from applying a new painting brush stroke to the paint that was on the canvas prior to the new painting brush stroke. In some embodiments, the neural network is a convolutional neural network.

In some embodiments, a high quality oil painting simulator is utilized to generate the training data sets to use in training a neural network. The simulator utilizes a 3D volumetric fluid simulation to simulate the paint medium, such as the oil paint, on a digital canvas. To generate a training data set, a height map of existing paint on a canvas and a painting brush stroke are input to the simulator, which in turn generates a ground truth based on the input height map and painting brush stroke pair. The simulator also generates a bristle trajectory map of the of the input painting brush stroke. The training data set is comprised of the height map input to the simulator and the bristle trajectory map and the ground truth generated by the simulator.

In some embodiments, an oil painting brush stroke is simulated using one or more instances of a trained neural network. For example, a single long oil painting brush stroke may be segmented into multiple oil painting brush stroke segments, and each oil painting brush stroke segment processed by a respective instance of the trained neural network. In such cases, the objective of each instance of the trained neural network is to infer, for a given height map of existing paint on a canvas and a respective bristle trajectory map segment representing a corresponding new painting brush stroke segment, a height map segment of paint on the canvas after the corresponding new painting brush stroke segment (the respective bristle trajectory map segment representing the corresponding new painting brush stroke segment) is applied to the canvas. That is, each instance of the trained neural network infers the new paint segment on the canvas resulting from applying a new painting brush stroke segment to the paint that was on the canvas prior to the new painting brush stroke segment.

Simulating oil painting brush strokes using trained neural networks produces higher quality representations of the 3D surface details of brush strokes without the use of complex fluid simulation. Accordingly, oil painting simulation applications that simulate painting brush strokes using trained neural networks are suitable for execution on computing devices, such as mobile computers and mobile devices, which may not possess sufficient computing power to perform fluid simulation. Although the embodiments and/or examples are described below in the context of oil paints and oil paintings, it will be appreciated in light of this disclosure that the embodiments and/or examples are not restricted to oil paints and oil paintings but are also applicable to thick paints, such as acrylics, and gouache, to name a few examples, in the general sense.

Figure 1:
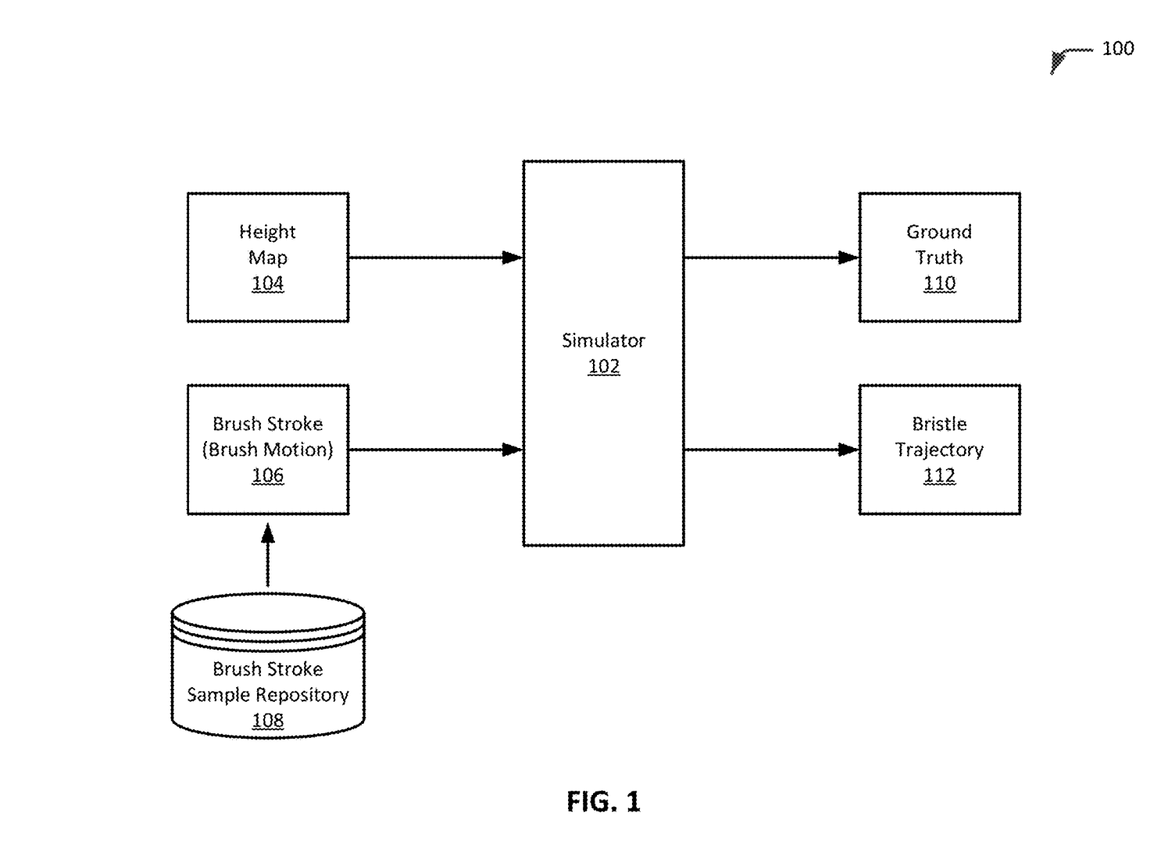
FIG. 1 is a diagram illustrating example components for generating training data for a neural network, in accordance with at least some embodiments described herein.

FIG. 1 is a diagram 100 illustrating example components for generating training data for a neural network, in accordance with at least some embodiments described herein. The generated training data is utilized to train a neural network to, provided a first height map of existing paint on the canvas and a bristle trajectory map as inputs, infer a second height map of existing paint on the canvas after a new painting brush stroke is applied. The bristle trajectory map input to the neural network represents the new brush stroke. As shown in diagram 100, the components for generating the training data for a neural network include a simulator 102, a height map 104, and a painting brush stroke 106 (interchangeably referred to herein as a "brush stroke 106" unless context dictates otherwise).

In some embodiments, simulator 102 is an oil painting simulation application that simulates the texture of oil paints, and the operation of the bristles of a paint brush to smear the oil paint across a digital canvas (interchangeably referred to herein as a "canvas", unless context dictates otherwise). In some instances, simulator 102 may utilize fluid simulation to simulate the individual bristles (e.g., thousands of individual bristles) of a paint brush, and the interactions among the bristles of the paint brush to generate a 3D model of the paint brush. The 3D model of the paint brush is used to interact with the paint medium to simulate the physical dynamics of the paint on the canvas. Simulator 102 may allow users (e.g., artists) to interact with simulated oil paints using a stylus on a touchscreen.

Height map 104 is a representation of existing paint on the canvas. Height map 104 represents the thickness of the paint that exists on the canvas. In some embodiments, height map 104 may be represented as a 2D image, for example, in 512 pixel×512 pixel resolution. As will be appreciated in light of this disclosure, other image resolutions may be used by height map 104 to represent the thickness of the paint that exists on the canvas. In some examples cases, the value at each pixel location of height map 104 represents the thickness of the paint at that pixel location. For example, if a value at a pixel location of height map 104 is zero (pixel value=0), then the thickness of the paint at that pixel location in height map 104 is 0 mm. If a value at a pixel location of height map 104 is one (pixel value=1), then the thickness of the paint at that pixel location in the height map is 1 mm. Similarly, a pixel value of 1.5 may indicate that thickness of the paint at that pixel location in height map 104 is 1.5 mm. In some embodiments, height map 104 (height map of existing paint on the canvas) that is input to simulator 102 to generate the training data for the neural network is randomly generated. That is, a randomly generated height map 104 is provided to simulator 102 for generating the training data for the neural network. For example, height map 104 can be generated by randomly rotating and/or overlaying brush stroke samples from a repository to mimic a random painting process.

Brush stroke 106 is a motion made by a paint brush during painting. For example, an artist typically paints stroke-by-stroke using a paint brush. Brush stroke 106 is a representation of one stroke (painting brush stroke motion) that would be made by the artist when painting. Brush stroke 106 may be one painting brush stroke selected from a corpus of painting brush strokes 106.

A brush stroke sample repository 108 may include or store the corpus of painting brush strokes. In some example cases, painting brush strokes generated by a user or users may be recorded, and the data corresponding to the recorded painting brush strokes (e.g., brush stroke data) may be maintained in brush stroke sample repository 108. Some or all of the brush strokes 106 (brush stroke data) may be used in generating the training data to train a neural network. In some embodiments, the recorded brush strokes 106 may be randomly rotated and/or combined to generate additional brush strokes 106.

Height map 104 (height map of existing paint on the canvas) and brush stroke 106 are provided as inputs to simulator 102, and simulator 102 generates a ground truth 110 and a bristle trajectory 112 (interchangeably referred to herein as a "bristle trajectory map"). Ground truth 110 is a height map of existing paint on the canvas after the brush stroke is applied to the canvas (e.g., applied to the existing paint on the canvas). That is, ground truth 110 is the height map of existing paint on the canvas after applying a new brush stroke (e.g., brush stroke 106 provided as input to simulator 102) to the height map that existed prior to applying the new brush stroke (e.g., height map 104 provided as input to simulator 102). In some embodiments, simulator 102 utilizes fluid simulation to generate ground truth 110.

Bristle trajectory map 112 is a representation of a trail of the bristle tips (e.g., all the bristle tips) of a paint brush generated as a result of brush stroke 106. For example, when a paint brush is swept along a path on the canvas, the tips of the bristles of the paint brush create a trail of the bristle tips on the canvas. Bristle trajectory map 112 may convey or indicate data such as bristle tip direction, bristle tip angle, pressure generated by the bristle tip on the canvas, and the like. Bristle trajectory map 112 generated by simulator 102 is a representation of the trail of the bristle tips of the paint brush that results from input brush stroke 106 (brush stroke 106 provided as input to simulator 102).

Height map 104 provided as input to simulator 102, and bristle trajectory map 112 and ground truth 110 generated by simulator 102 as a result of the input height map 104, comprise a training data set (e.g., training data 3-tuple), which is used to train a neural network to infer a height map of existing paint on the canvas after a new brush stroke is applied. Simulator 102 may be utilized to generate a large number of training data sets, which may be used to train the neural network. For example, a large number of height maps 104 may be randomly generated, and each height map 104 paired with a brush stroke 106, for example, from brush stroke sample repository 108. The pairs of randomly generated height maps 104 and brush strokes 106 may then be provided as inputs to simulator 102 to generate corresponding pairs of ground truths 110 and bristle trajectory maps 112. Each height map 104 input to simulator 102, and the corresponding bristle trajectory map 112 and ground truth 110 generated by simulator 102 may comprise a corresponding training data set, thus resulting in the creation of a large number of training data sets.

Figure 2:
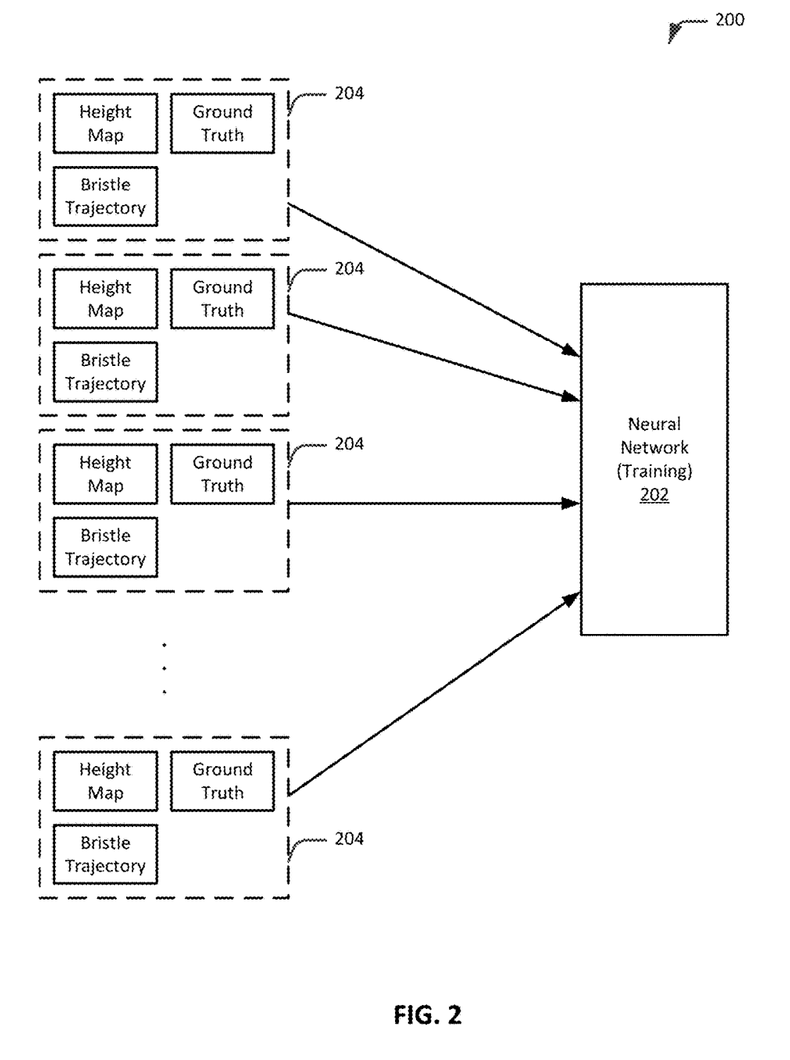
FIG. 2 is a diagram illustrating example training data inputs to a neural network, in accordance with at least some embodiments described herein.

FIG. 2 is a diagram 200 illustrating example training data inputs to a neural network 202, in accordance with at least some embodiments described herein. As shown in diagram 200, a large number, and in some cases a very large number, of training data sets 204 are used to train neural network 202. Training data sets 204 are used to train neural network 202 to, provided a height map of existing paint on the canvas and a bristle trajectory map as inputs, infer a height map of existing paint on the canvas after a new brush stroke is applied. In this instance, the bristle trajectory map that is provided as input to neural network 202 represents the new brush stroke.

Each training data set 204 includes a height map, a bristle trajectory map, and a ground truth. The height map is a height map of existing paint on the canvas (height map 104 of FIG. 1) that, along with a brush stroke (brush stroke 106 of FIG. 1), was provided as input to simulator 102 to generate the corresponding ground truth (ground truth 110 of FIG. 1) and the corresponding bristle trajectory map (bristle trajectory map 112 of FIG. 1). In each training data set 204, the ground truth is the height map that is expected as a result of applying a new brush stroke (as represented by brush stroke 106 input to simulator 102) on the existing paint on the canvas (as represented by height map 104 included in the training data set and input to simulator 102). The bristle trajectory map is a representation of a trail of the bristle tips of a paint brush that is generated as a result of the new brush stroke. That is, as to each training data 3-tuple, ground truth, height map, and bristle trajectory map, a ground truth of a training data 3-tuple is the output expected from a neural network trained using training data set 204 when the neural network trained using training data set 204 is provided a height map and a bristle trajectory map of the training data 3-tuple as inputs. Once trained, neural network 202 is configured to infer a height map of existing paint on the canvas after applying a new brush stroke (e.g., a very close if not exact approximation of ground truth 110 generated by simulator 102 of FIG. 1, and used to train neural network 202) provided a height map of existing paint on the canvas that existed prior to applying the new brush stroke (height map 104 input to simulator 102 of FIG. 1 to generate ground truth 110 used to train neural network 202) and a bristle trajectory map (bristle trajectory map 112 generated by simulator 102 of FIG. 1, and used to train neural network 202) as inputs.

Figure 3:
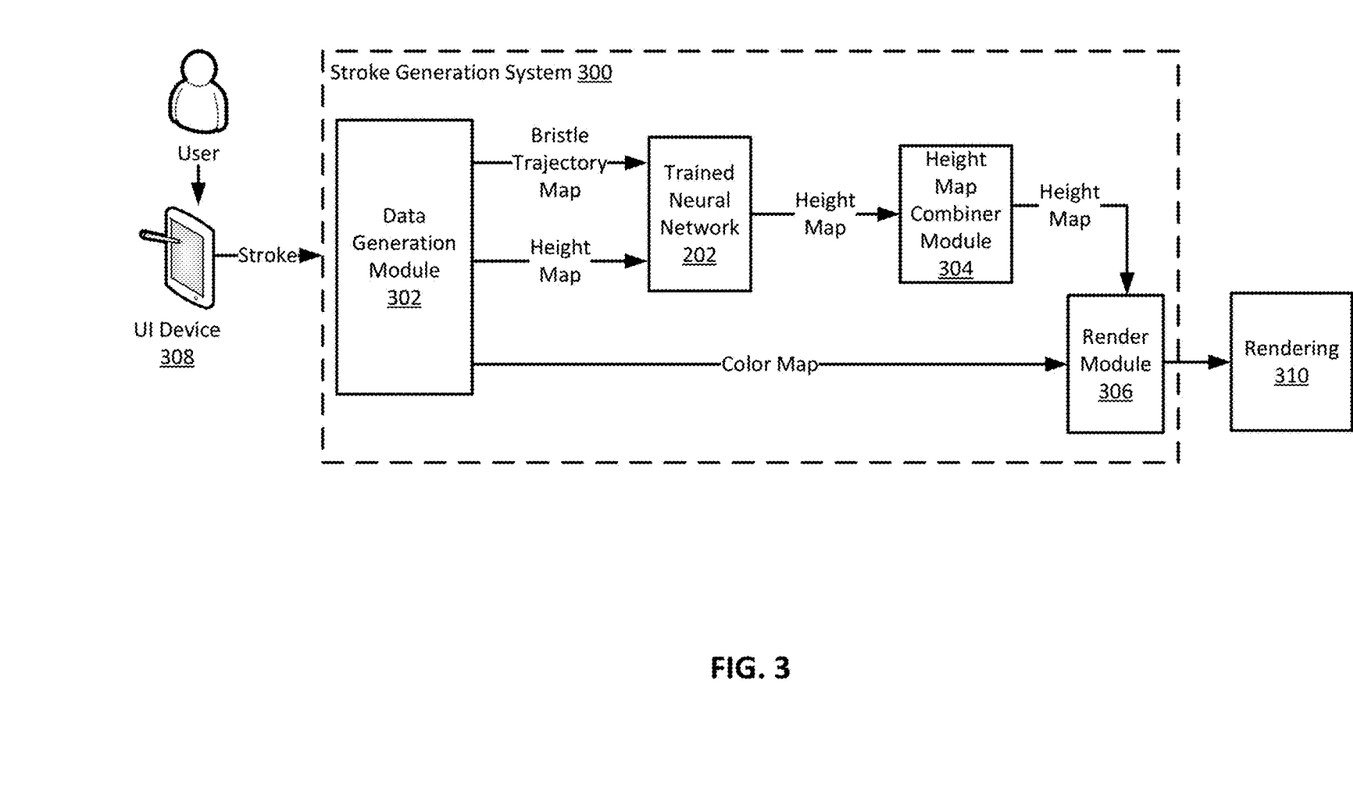
FIG. 3 is a block diagram schematically illustrating an example stroke generation system employing a single neural network, in accordance with at least some embodiments described herein.

FIG. 3 is a block diagram schematically illustrating an example stroke generation system 300 employing a single neural network 202, in accordance with at least some embodiments described herein. As depicted, stroke generation system 300 includes a data generation module 302, a trained neural network 202, a height map combiner module 304, and a render module 306. In various embodiments, additional components (not illustrated, such as a processor, display, user input device, etc.) or a subset of the illustrated components can be employed without deviating from the scope of the present disclosure. For instance, other embodiments may integrate the various functionalities of modules 302, 304, and 306, and trained neural network 202 into fewer modules (e.g., one, two, or three) or more modules (e.g., five or six, or more). In addition, further note that the various components of stroke generation system 300 may all be in a stand-alone computing system according to some embodiments, while in others, may be distributed across multiple machines. For example, each of modules 302, 304, and 306, and trained neural network 202 can be located in a cloud-based server arrangement, and made accessible to a client-based user interface via a communications network. In some cases, one or more of modules 302, 304, and 306, and trained neural network 202 may be downloaded from a cloud-based service into a browser (or other application) of a client computer for local execution. In a more general sense, the degree of integration and distribution of the functional component(s) provided herein can vary greatly from one embodiment to the next, as will be appreciated in light of this disclosure.

In the illustrated example, a user (e.g., an artist) may be using stroke generation system 300 to create a simulated oil painting on a digital canvas. The user may utilize any suitable user interface device, for example, a user interface (UI) device 308, which facilitates interaction with stroke generation system 300. In some cases, UI device 308 may provide a stylus and touch sensitive screen for use by the user. UI device 308 may be coupled to stroke generation system 300, and the user may use UI device 308 to create a digital oil painting. For example, the user may use the stylus to input (e.g., generate) digital painting brush strokes, stroke-by-stroke, on the touch sensitive screen of UI device 308.

When the user uses UI device 308 and generates a painting brush stroke (a current painting brush stroke), UI device 308 provides or otherwise makes available the current painting brush stroke generated by the user to data generation module 302. Data generation module 302 is configured to generate a bristle trajectory map that represents the current painting brush stroke input by the user. In some embodiments, data generation module 302 generates the bristle trajectory map by sweeping a simulated brush on the canvas and recording the brush bristle contact trails while the brush is being swept. For example, data generation module 302 can generate the bristle trajectory map by drawing the trails of the brush bristles moving over the length of the brush stroke. The trails of the brush bristles may overlap in the bristle trajectory map. Data generation module 302 is also configured to generate a color map based on the current painting brush stroke and the current state of the canvas (e.g., the existing paint on the canvas). For example, data generation module 302 can generate the color map using one of the many available stamping algorithms. Available stamping algorithms typically draw an imprint stamp of a paint brush, for example, at one pixel intervals, along each stroke path. At each stamp, the paint brush color is mixed with the existing paint color that is on the canvas, and the canvas color is accordingly updated. The color on the paint brush may also be similarly updated to simulate the transfer of color from the existing paint on the canvas to the paint brush. Data generation module 302 has knowledge of the height map of existing paint on the canvas that resulted from a previous brush stroke (the brush stroke preceding the current brush stroke generated by the user). In the instance where the current painting brush stroke is a first or initial painting brush stroke, the canvas may be a clean canvas in that no paint currently exists on the canvas. Where there is no existing paint on the canvas, the height map accordingly indicates that there is no paint currently on the canvas. Data generation module 302 is configured to provide or otherwise make available the generated bristle trajectory map and the height map of existing paint on the canvas to trained neural network 202. For example, data generation module 302, or another component of stroke generation system 300, may instantiate an instance of trained neural network 202 to process the bristle trajectory map and the height map of existing paint on the canvas.

Trained neural network 202 is configured to infer a height map of paint on the canvas after the current painting brush stroke is applied. The height map inferred by trained neural network 202 is a new height map that represents the height of the paint that is now on the canvas subsequent to applying the current painting brush stroke, as represented by the bristle trajectory map provided as input to trained neural network 202, to the paint that existed on the canvas prior to application of the current painting brush stroke, as represented by the height map of existing paint on the canvas provided as input to trained neural network 202. That is, provided a first height map (a height map of existing paint on the canvas) and a bristle trajectory map (a current painting brush stroke), trained neural network 202 infers a second height map (a height map of paint on the canvas after the current painting brush stroke is applied). Trained neural network 202 provides or otherwise makes available the inferred height map of paint on the canvas after the current brush stroke is applied to height map combiner module 304.

Height map combiner module 304 is configured to combine multiple height map segments to generate a single combined height map. Height map segments are further discussed below, for example, in conjunction with FIGS. 4 and 5. In this instance, height map combiner module 304 determines that the provided height map is a combined height map in that only one (a single) height map was provided. As such, height map combiner module 304 does not perform any combining operation with the provided height map. Height map combiner module 304 provides or otherwise makes available the height map of paint on the canvas after the current brush stroke is applied to render module 306.

Render module 306 is configured to combine the height map (e.g., height map of existing paint on the canvas after the current brush stroke is applied) and the color map to generate a rendering 310. The color map may be provided or otherwise made available by data generation module 302. Rendering 310 is a visual representation of the current painting brush stroke input by the user on the canvas. That is, rendering 310 is a digital representation of the digital painting brush stroke created by the user on the touch sensitive screen of UI device 308. In some embodiments, render module 306 can generate rendering 310 by computing a normal map based on the height map using a central difference algorithm. Render module 306 can then compute the illuminance of the paint from the generated normal map and lighting data. The lighting data may be provided by the user using, for example, a point light source, a directional light source, a spotlight, or any other suitable lighting model. Render module 306 can then generate the final colored shading result (e.g., rendering 310) based on the computed illuminance and the color map, which provides a measure for reflectance or optical brightness of the canvas. Rendering 310 of the painting brush stroke created by the user may be provided on UI device 308, for example, the touch sensitive screen of UI device 308, for viewing by the user.

Figure 4:
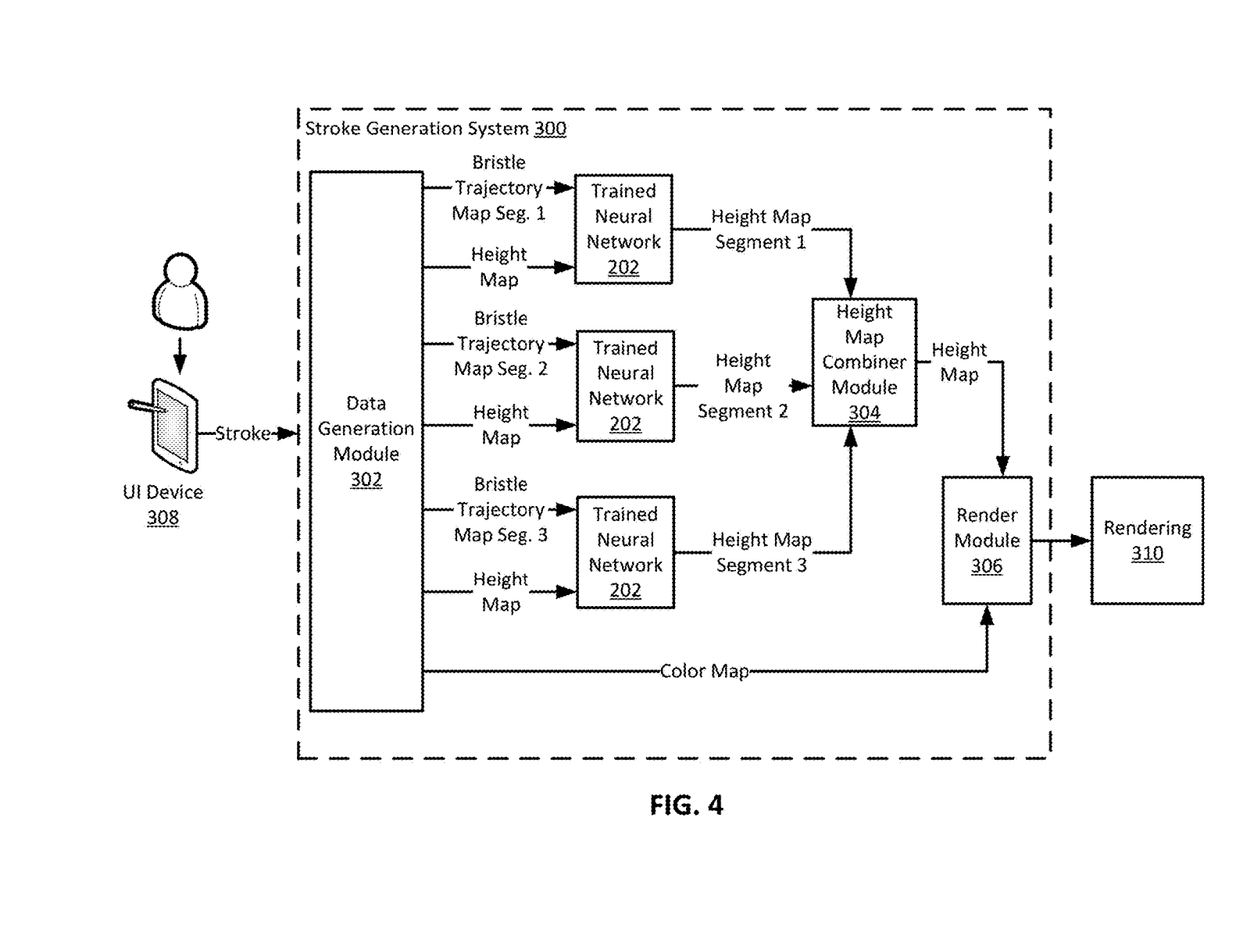
FIG. 4 is a block diagram schematically illustrating the example stroke generation system of FIG. 3 employing multiple instances of a trained neural network, in accordance with at least some embodiments described herein.

FIG. 4 is a block diagram schematically illustrating stroke generation system 300 employing multiple instances of trained neural network 202, in accordance with at least some embodiments described herein. The system of FIG. 4 is substantially similar to the system of FIG. 3, with additional details. Unless context dictates otherwise, those components in FIG. 4 that are labelled identically to components of FIG. 3 will not be described again for the purposes of clarity.

In some embodiments, data generation module 302 is configured to segment a long bristle trajectory map (e.g., a long painting brush stroke) into multiple bristle trajectory map segments (e.g., multiple painting brush stroke segments). Processing multiple shorter bristle trajectory map segments and combining the results of the processing of the shorter bristle trajectory map segments may provide improved performance as compared to processing a single long bristle trajectory map. Data generation module 302 can determine a length of the bristle trajectory map and, if the length of the bristle trajectory map exceeds a specified threshold bristle trajectory map segment length, segment the bristle trajectory map into multiple bristle trajectory map segments such that the length of each bristle trajectory map segment, except the last bristle trajectory map segment, is of the specified threshold bristle trajectory map segment length. For example, suppose the specified threshold bristle trajectory map segment length is 512 pixels and the length of the bristle trajectory map is 1,500 pixels. In this case, data generation module 302 can segment the bristle trajectory map into three bristle trajectory map segments, where two bristle trajectory map segments are each of length 512 pixels, and one bristle trajectory map segment is of length 476 pixels. The threshold bristle trajectory map segment length may be preconfigured, for example, by a provider of stroke generation system 300. In some embodiments, the threshold bristle trajectory map segment length may be a tunable parameter. For example, the threshold bristle trajectory map segment length may be specified in a configuration file that is accessible by stroke generation system 300, and a user (or system administrator) may tune or adjust the threshold bristle trajectory map segment length based on the performance of stroke generation system 300. For example, a user can tune the threshold bristle trajectory map segment length to achieve a desired performance of stroke generation system 300.

In some embodiments, data generation module 302 can generate a bounding box for each bristle trajectory map segment. A bounding box delineates or defines the bounds (e.g., boundary) of a bristle trajectory map segment. For example, a bounding box may be specified by the coordinates of the four corners of the bounding box. In some embodiments, a bounding box for a bristle trajectory map segment is generated in a manner as to tightly bound the bristle trajectory map segment. That is, the bounding box is generated such that, within the bounding box, the number of pixels that do not represent the painting brush stroke segment is reduced or minimized. Minimizing the number of pixels that do not represent the painting brush stroke segment in the bounding box results in a reduction in computational costs. For example, reducing or minimizing the number of pixels that do not represent a painting brush stroke segment reduces the number of "unnecessary" pixels that need to be processed by trained neural network 202 in processing the bristle trajectory map segment of the painting brush stroke segment. Each bristle trajectory map segment represents a respective segment of the current painting brush stroke input by the user.

Data generation module 302 is configured to provide or otherwise make available each bristle trajectory map segment and the height map of existing paint on the canvas to a respective trained neural network 202. For example, data generation module 302, or another component of stroke generation system 300, may instantiate multiple instances of trained neural network 202, each instance of trained neural network 202 to process a respective bristle trajectory map segment and the height map of existing paint on the canvas. That is, each trained neural network 202 of the multiple trained neural networks 202 is provided a respective bristle trajectory map segment and the height map of existing paint on the canvas as inputs. Although data generation module 302 is depicted as segmenting a bristle trajectory map into three bristle trajectory map segments, the number of bristle trajectory map segments is for illustrative purposes, and a different number of bristle trajectory map segments may be generated based on the length of the bristle trajectory map and the specified bristle trajectory map segment length, as will be appreciated in light of this disclosure.

Figure 5:
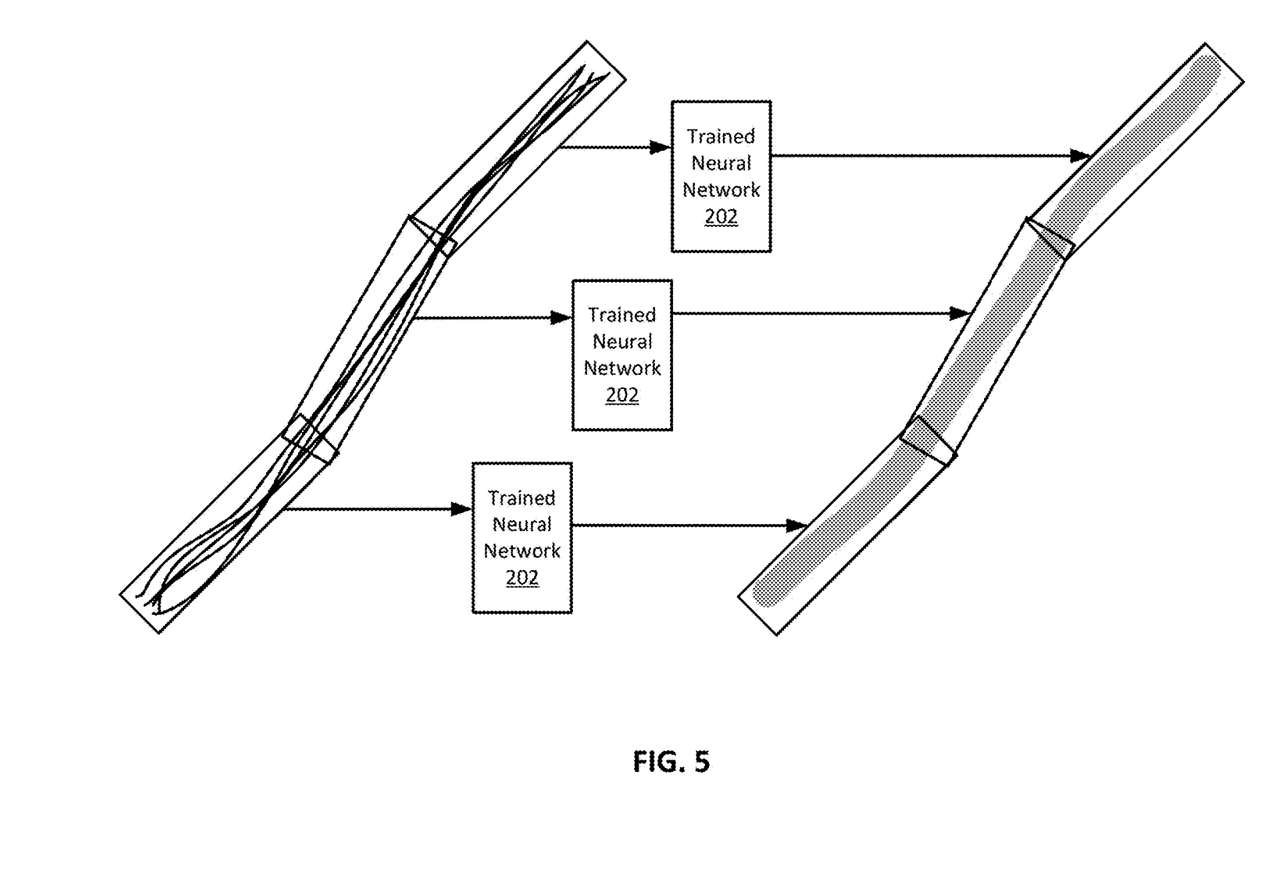
FIG. 5 is a block diagram schematically illustrating multiple bristle trajectory map segments and corresponding height map segments generated by multiple trained neural networks, in accordance with at least some embodiments described herein.

FIG. 5 is a block diagram schematically illustrating multiple bristle trajectory map segments and corresponding height map segments generated by multiple trained neural networks 202, in accordance with at least some embodiments described herein. As discussed above, each bristle trajectory map segment corresponds to a segment of a bristle trajectory map, where the bristle trajectory map represents a current painting brush stroke. As such, each bristle trajectory map segment is a representation of a trail of the bristle tips of a paint brush generated as a result of a respective current painting brush stroke segment. Each bristle trajectory map segment is delineated by a bounding box. Each bristle trajectory map segment is processed by a respective trained neural network 202, which infers a corresponding height map of paint on the canvas after the current painting brush stroke segment is applied as represented by the bristle trajectory map segment is applied. The height map inferred by each trained neural network 202 is a height map segment that represents the height of the paint that is now on the canvas subsequent to applying the current painting brush stroke segment to the paint that existed on the canvas prior to application of the current painting brush stroke segment. Similar to the bounding boxes that bound the bristle trajectory map segments, each height map segment may be delineated or defined by a bounding box.

Referring again to FIG. 4, each trained neural network 202 provides or otherwise makes available the generated height map segment (the height map of paint on the canvas after the current painting brush stroke segment is applied) to height map combiner module 304. Height map combiner module 304 combines the multiple height map segments, for example, provided by respective multiple trained neural networks 202, to generate a single combined height map. For example, height map combiner module 304 may combine the multiple height map segments by collaging the non-overlapping regions of the height map segments, and averaging the height map values in the overlapping regions of two adjoining height map segments.

In some embodiments, each of the multiple bounding boxes is generated such that an overlap region is created between two adjoining bounding boxes. The overlap regions allow for the blending of the height map segments that are in the overlap regions to provide continuity of the painting brush stroke segments when combining two adjoining height map segments. In some embodiments, the overlap region is a specified number of pixels, such as 8 pixels, 16 pixels, 32 pixels, etc., along the general direction or length of the painting brush stroke. That is, between two adjoining height map segments, a respective end of each of the two adjoining height map segments overlap for the specified number of pixels along the general direction or length of the adjoining height map segment. The size (e.g., length) of the overlap region may contribute to the continuity of a resulting height map when adjoining height map segments are combined. That is, a large overlap region may result in the generation of a more continuous height map as compared to a small overlap region. The size of the overlap region may be preconfigured, for example, by a provider of stroke generation system 300. In some embodiments, the size of the overlap region may be a tunable parameter. For example, the size of the overlap region may be specified in a configuration file that is accessible by stroke generation system 300, and a user (or system administrator) may tune or adjust the size of the overlap region based on the performance (e.g., smoothness or other visual characteristic of the rendered painting brush stroke) of stroke generation system 300. For example, a user can tune the size of the overlap region to achieve a desired smoothness of the painting brush stroke rendered by stroke generation system 300.

Figure 6:
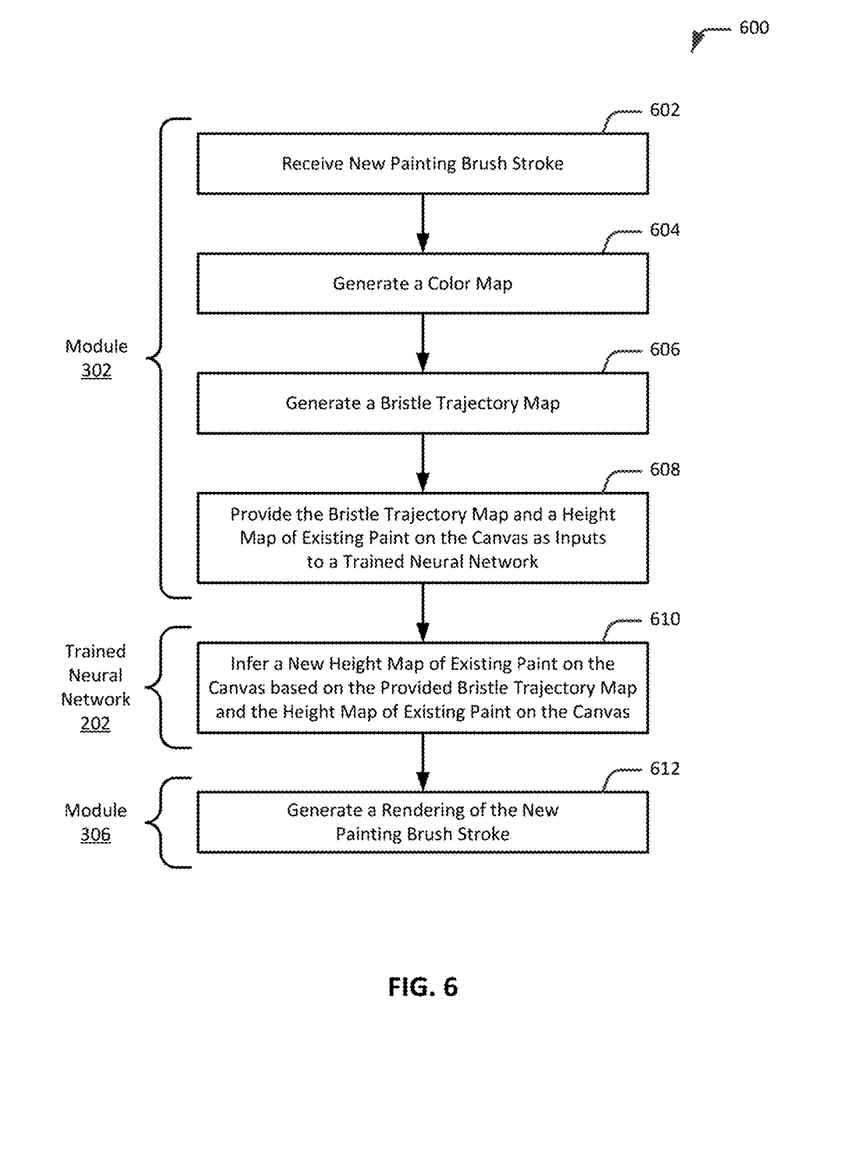
FIG. 6 is a flow diagram illustrating an example process to render a new painting brush stroke, in accordance with at least some embodiments described herein.

FIG. 6 is a flow diagram 600 illustrating an example process to render a new painting brush stroke, in accordance with at least some embodiments described herein. Example processes and methods may include one or more operations, functions or actions as illustrated by one or more of blocks 602, 604, 606, 608, 610, and/or 612, and may in some embodiments be performed by a computing system such as a computing system 700 of FIG. 7. The operations described in blocks 602-612 may also be stored as computer-executable instructions in a computer-readable medium, such as a memory 704 and/or a data storage 706 of computing system 700. The process may be performed by components of stroke generation system 300.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As depicted by flow diagram 600, the process may begin with block 602, where stroke generation system 300 receives a new painting brush stroke. By way of an example use case, a user may be executing stroke generation system 300 on a computing device, to create a simulated oil painting on a canvas. Stroke generation system 300 may provide a stylus and a touch sensitive screen for use by the user to create an oil painting, and the user may have generated a new painting brush stroke on the canvas using the provided stylus and touch sensitive screen. In response, data generation module 302 receives the new painting brush stroke generated by the user.

Block 602 may be followed by block 604, where data generation module 302 generates a color map based on the received new painting brush stroke and a current state of the canvas (e.g., the existing paint on the canvas).

Block 604 may be followed by block 606, where data generation module 302 generates a bristle trajectory map that represents the received new painting brush stroke.

Block 606 may be followed by block 608, where data generation module 302 provides the bristle trajectory map and a height map of existing paint on the canvas as inputs to trained neural network 202. Data generation module 302 has knowledge of the height map of existing paint on the canvas by virtue of stroke generation system 300 having processed the painting brush stroke preceding the current, new painting brush stroke.

Block 608 may be followed by block 610, where trained neural networks 202 infers a new height map of existing paint on the canvas based on the bristle trajectory map and the height map of existing paint on the canvas that was provided as inputs. Continuing the above example, the new height map inferred by trained neural network 202 is a new height map that represents the height of the paint that is now on the canvas subsequent to applying the new painting brush stroke to the canvas.

Block 610 may be followed by block 612, where render module 306 generates a rendering of the new painting brush stroke on the canvas based on the new height map of existing paint on the canvas and the color map. Continuing the above example, the rendering of the new painting brush stroke can be generated on the touch sensitive screen on which the user generated the new painting brush stroke.

In some embodiments, additional operations may be performed. For example, in some embodiments, data generation module 302 may segment the bristle trajectory map representing the new painting brush stroke into one or more bristle trajectory map segments based on a specified threshold bristle trajectory map segment length. For example, data generation module 302 can determine a length of the bristle trajectory map and, if the length of the bristle trajectory map does not exceed the specified bristle trajectory map segment length, generate one bristle trajectory map segment from the bristle trajectory map. Alternatively, if the length of the bristle trajectory map exceeds the specified threshold bristle trajectory map segment length, data generation module can segment the bristle trajectory map into multiple bristle trajectory map segments such that the length of each bristle trajectory map segment, except the last bristle trajectory map segment, is of the specified threshold bristle trajectory map segment length. Data generation module 302 may then provide each bristle trajectory map segment and the height map of existing paint on the canvas to a respective trained neural network 202. Each respective trained neural network 202 can infer a height map segment based on the bristle trajectory map segment and the height map of existing paint on the canvas that was provided as inputs. A single height map of paint existing on the canvas can be generated based on the height map segments inferred by the multiple trained neural networks 202. For example, height map combiner module 304 can combine the height map segments to generate the single height map of existing paint on the canvas after the new painting brush stroke is applied.

Figure 7:
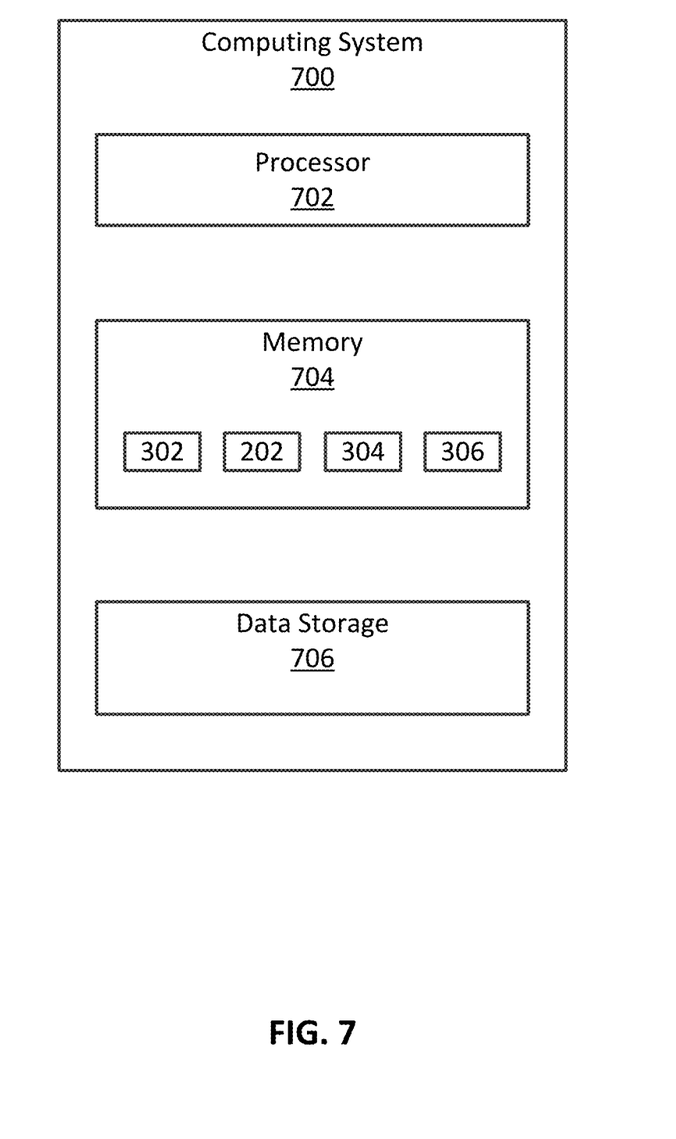
FIG. 7 illustrates selected components of an example computing system that may be used to perform any of the techniques as variously described in the present disclosure, in accordance with at least some embodiments described herein.

FIG. 7 illustrates selected components of example computing system 700 that may be used to perform any of the techniques as variously described in the present disclosure, in accordance with at least some embodiments described herein. In some embodiments, computing system 700 may be configured to implement or direct one or more operations associated with some or all of the engines, components and/or modules associated with stroke generation system 300 of FIG. 3. For example, data generation module 302, trained neural network 202, height map combiner module 304, and render module 306, or any combination of these may be implemented in and/or using computing system 700. In one example case, for instance, each of data generation module 302, trained neural network 202, height map combiner module 304, and render module 306 is loaded in memory 704 and executable by a processor 702. Computing system 700 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 700 may include processor 702, memory 704, and data storage 706. Processor 702, memory 704, and data storage 706 may be communicatively coupled.

In general, processor 702 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, processor 702 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 702 may be configured to interpret and/or execute program instructions and/or process data stored in memory 704, data storage 706, or memory 704 and data storage 706. In some embodiments, processor 702 may fetch program instructions from data storage 706 and load the program instructions in memory 704. After the program instructions are loaded into memory 704, processor 702 may execute the program instructions.

For example, in some embodiments, any one or more of the engines, components and/or modules of stroke generation system 300 may be included in data storage 706 as program instructions. Processor 702 may fetch some or all of the program instructions from data storage 706 and may load the fetched program instructions in memory 704. Subsequent to loading the program instructions into memory 704, processor 702 may execute the program instructions such that the computing system may implement the operations as directed by the instructions.

In some embodiments, virtualization may be employed in computing device 700 so that infrastructure and resources in computing device 700 may be shared dynamically. For example, a virtual machine may be provided to handle a process running on multiple processors so that the process appears to be using only one computing resource rather than multiple computing resources. Multiple virtual machines may also be used with one processor.

Memory 704 and data storage 706 may include computer-readable storage media for carrying or having computer-executable instructions or data structures stored thereon. Such computer-readable storage media may include any available media that may be accessed by a general-purpose or special-purpose computer, such as processor 702. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 702 to perform a certain operation or group of operations.

Modifications, additions, or omissions may be made to computing system 700 without departing from the scope of the present disclosure. For example, in some embodiments, computing system 700 may include any number of other components that may not be explicitly illustrated or described herein.

As indicated above, the embodiments described in the present disclosure may include the use of a special purpose or a general purpose computer (e.g., processor 702 of FIG. 7) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 704 of FIG. 7) for carrying or having computer-executable instructions or data structures stored thereon.

Numerous example variations and configurations will be apparent in light of this disclosure. According to some examples, computer-implemented methods to simulate a painting brush stroke are described. An example computer-implemented method may include: inferring, by a trained neural network having a first input to receive a bristle trajectory map that represents a new painting brush stroke and a second input to receive a first height map of existing paint on a canvas, a second height map of existing paint on the canvas after the new painting brush stroke is applied to the canvas; and generating, by a render module, a rendering of the new painting brush stroke based on the second height map of existing paint on the canvas after the new painting brush stroke is applied to the canvas and a color map.

In some examples, the trained neural network is trained using multiple training data sets, each training data set of the multiple training data sets including a height map, a bristle trajectory map, and a ground truth. In other examples, for each training data set, the bristle trajectory map and the ground truth are generated by a simulator in response to being provided the height map as an input. In still other examples, the simulator utilizes fluid simulation to generate the ground truth. In yet other examples, the bristle trajectory map is a bristle trajectory map segment that represents a new painting brush stroke segment, and further wherein the second height map is a second height map segment of existing paint on the canvas after the new painting brush stroke segment is applied to the canvas. In other examples, the bristle trajectory map segment is delineated by a bounding box, or the second height map segment is delineated by a bounding box, or both the bristle trajectory map segment and the second height map segment are delineated by a respective bounding box. In still other examples, the new painting brush stroke is a new oil painting brush stroke. In still further examples, the trained neural network is one of multiple trained neural networks, each trained neural network of the multiple trained networks having a respective first input to receive a respective bristle trajectory map segment that represents a new painting brush stroke segment and a respective second input to receive a first height map of existing paint on a canvas, and the inferring is carried out by the multiple trained neural networks such that each trained neural network is configured to infer a respective second height map segment of existing paint on the canvas after the new painting brush stroke is applied to the canvas, the method further including: generating, by a height map combiner module, a combined second height map based on the respective second height map segment inferred by each trained neural network of the multiple trained neural networks, wherein generating, by the render module, a rendering of the new painting brush stroke is based on the combined second height map.

According to some examples, computer program products including one or more non-transitory machine readable mediums encoded with instructions that when executed by one or more processors cause a process to be carried out to simulate a painting brush stroke are described. An example process may include: inferring, by a trained neural network having a first input to receive a bristle trajectory map that represents a new painting brush stroke and a second input to receive a first height map of existing paint on a canvas, a second height map of existing paint on the canvas after the new painting brush stroke is applied to the canvas; and generating a rendering of the new painting brush stroke based on the second height map of existing paint on the canvas after the new painting brush stroke is applied to the canvas and a color map.

In some examples, the trained neural network is trained using multiple training data sets, each training data set of the multiple training data sets including a height map, a bristle trajectory map, and a ground truth. In other examples, for each training data set, the bristle trajectory map and the ground truth are generated by a simulator in response to being provided the height map as an input. In still other examples, the simulator utilizes fluid simulation to generate the ground truth. In yet other examples, the bristle trajectory map is a bristle trajectory map segment that represents a new painting brush stroke segment, and further wherein the second height map is a second height map segment of existing paint on the canvas after the new painting brush stroke segment is applied to the canvas. In other examples, the bristle trajectory map segment is delineated by a bounding box, or the second height map segment is delineated by a bounding box, or both the bristle trajectory map segment and the second height map segment are delineated by a respective bounding box. In still other examples, the new painting brush stroke is a new oil painting brush stroke. In still further examples, the trained neural network is one of multiple trained neural networks, each trained neural network of the multiple trained neural networks having a respective first input to receive a respective bristle trajectory map segment that represents a new painting brush stroke segment and a respective second input to receive a first height map of existing paint on a canvas, and the inferring is carried out by the multiple trained neural networks such that each trained neural network is configured to infer a respective second height map segment of existing paint on the canvas after the new painting brush stroke segment is applied to the canvas, the process further including: generating a combined second height map based on the respective second height map segment inferred by each trained neural network of the multiple trained neural networks, wherein generating a rendering of the new painting brush stroke is based on the combined second height map.

According to some examples, systems to simulate a painting brush stroke are described. An example system may include: one or more processors; one or more trained neural networks, each trained neural network at least one of controllable and executable by the one or more processors, each trained neural network having a first input to receive a respective bristle trajectory map segment that represents a new painting brush stroke segment and a second input to receive a first height map of existing paint on a canvas, each neural network configured to infer a respective second height map segment of existing paint on the canvas after the new painting brush stroke is applied to the canvas; a height map combiner module at least one of controllable and executable by the one or more processors, and configured to generate a height map based on the respective second height map segment inferred by each trained neural network; and a render module at least one of controllable and executable by the one or more processors, and configured to generate a rendering of the new painting brush stroke based on the second height map of existing paint on the canvas after the new painting brush stroke is applied to the canvas and a color map.

In some examples, each trained neural network is trained using multiple training data sets, each training data set of the multiple training data sets including a height map, a bristle trajectory map, and a ground truth. In other examples, for each training data set, the bristle trajectory map and the ground truth are generated by a simulator in response to being provided the height map as an input. In still other examples, the bristle trajectory map segment is delineated by a bounding box, or the second height map segment is delineated by a bounding box, or the bristle trajectory map segment and the second height map segment are delineated by a respective bounding box.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to simulate a painting brush stroke, the method comprising:
inferring, by each of one or more trained neural networks having a respective first input to receive a respective bristle trajectory map segment that represents a new painting brush stroke segment and a second input to receive a first height map of existing paint on a canvas, a respective second height map segment of existing paint on the canvas after the new painting brush stroke is applied to the canvas;
generating, by a height map combiner module, a second height map based on the respective second height map segment inferred by each trained neural network; and
generating, by a render module, a rendering of the new painting brush stroke based on the second height map of existing paint on the canvas after the new painting brush stroke is applied to the canvas and a color map,
wherein each trained neural network is trained using a plurality of training data sets, each training data set of the plurality of training data sets comprising a height map, a bristle trajectory map, and a ground truth.

2. The method of claim 1, wherein, for each training data set, the bristle trajectory map and the ground truth are generated by a simulator in response to being provided the height map as an input.

3. The method of claim 2, wherein the simulator utilizes fluid simulation to generate the ground truth.

4. The method of claim 1, wherein the bristle trajectory map segment is delineated by a bounding box, or the second height map segment is delineated by a bounding box, or both the bristle trajectory map segment and the second height map segment are delineated by a respective bounding box.

5. The method of claim 1, wherein the new painting brush stroke is a new oil painting brush stroke.

6. The method of claim 1, wherein a length of each bristle trajectory map segment is based on a threshold bristle trajectory map segment length.

7. A computer program product including one or more non-transitory machine readable mediums encoded with instruction that when executed by one or more processors cause a process to be carried out to simulate a painting brush stroke, the process comprising:
inferring, by each of one or more trained neural networks having a respective first input to receive a respective bristle trajectory map segment that represents a new painting brush stroke segment and a second input to receive a first height map of existing paint on a canvas, a respective second height map segment of existing paint on the canvas after the new painting brush stroke is applied to the canvas;
generating a second height map based on the respective second height map segment inferred by each trained neural network; and
generating a rendering of the new painting brush stroke based on the second height map of existing paint on the canvas after the new painting brush stroke is applied to the canvas and a color map,
wherein each trained neural network is trained using a plurality of training data sets, each training data set of the plurality of training data sets comprising a height map, a bristle trajectory map, and a ground truth.

8. The computer program product of claim 7, wherein, for each training data set, the bristle trajectory map and the ground truth are generated by a simulator in response to being provided the height map as an input.

9. The computer program product of claim 8, wherein the simulator utilizes fluid simulation to generate the ground truth.

10. The computer program product of claim 7, wherein the bristle trajectory map segment is delineated by a bounding box, or the second height map segment is delineated by a bounding box, or both the bristle trajectory map segment and the second height map segment are delineated by a respective bounding box.

11. The computer program product of claim 7, wherein the new painting brush stroke is a new oil painting brush stroke.

12. A system to simulate a painting brush stroke, the system comprising:
one or more processors;
one or more trained neural networks, each trained neural network at least one of controllable and executable by the one or more processors, each trained neural network having a first input to receive a respective bristle trajectory map segment that represents a new painting brush stroke segment and a second input to receive a first height map of existing paint on a canvas, each trained neural network configured to infer a respective second height map segment of existing paint on the canvas after the new painting brush stroke is applied to the canvas;
a height map combiner module at least one of controllable and executable by the one or more processors, and configured to generate a second height map based on the respective second height map segment inferred by each trained neural network; and
a render module at least one of controllable and executable by the one or more processors, and configured to generate a rendering of the new painting brush stroke based on the second height map of existing paint on the canvas after the new painting brush stroke is applied to the canvas and a color map,
wherein each trained neural network is trained using a plurality of training data sets, each training data set of the plurality of training data sets comprising a height map, a bristle trajectory map, and a ground truth.

13. The system of claim 12, wherein, for each training data set, the bristle trajectory map and the ground truth are generated by a simulator in response to being provided the height map as an input.

14. The system of claim 12, wherein the bristle trajectory map segment is delineated by a bounding box, or the second height map segment is delineated by a bounding box, or the bristle trajectory map segment and the second height map segment are delineated by a respective bounding box.

* * * * *